(No Model.)
O. E. DAVIS.
SAND BAND FOR VEHICLE HUBS.
No. 303,820. Patented Aug. 19, 1884.
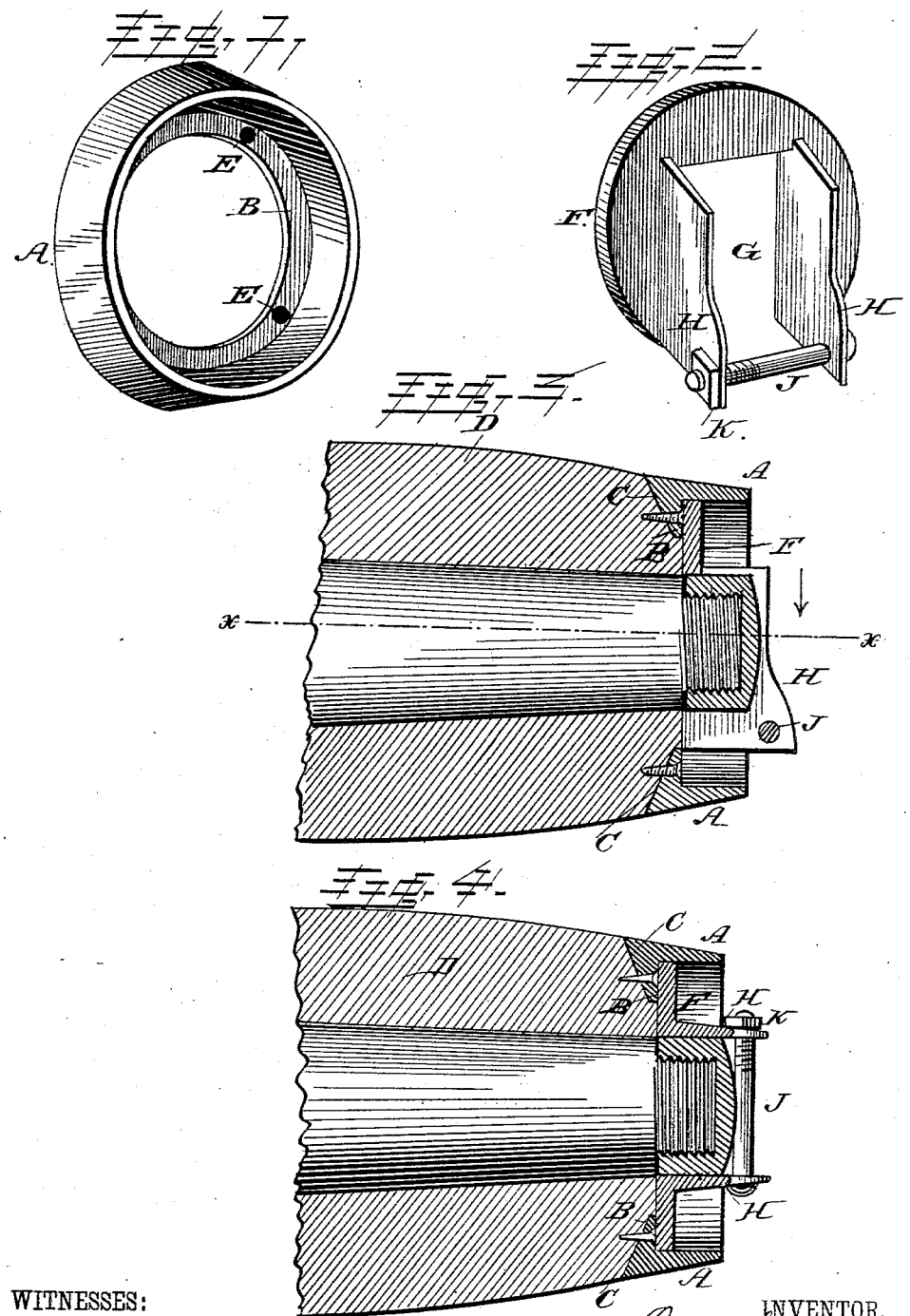
WITNESSES:
Fred. G. Dieterich
Arthur L. Morsell
INVENTOR.
Oscar E. Davis,
By Louis Bagger & Co.,
ATTORNEYS.

UNITED STATES PATENT OFFICE.

OSCAR E. DAVIS, OF WALWORTH, WISCONSIN.

SAND-BAND FOR VEHICLE-HUBS.

SPECIFICATION forming part of Letters Patent No. 303,820, dated August 19, 1884.

Application filed March 11, 1884. (No model.)

*To all whom it may concern:*

Be it known that I, OSCAR E. DAVIS, a citizen of the United States, and a resident of Walworth, in the county of Walworth and State of Wisconsin, have invented certain new and useful Improvements in Sand-Bands for Vehicle-Hubs; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the sand-band detached. Fig. 2 is a similar view of the clip-plate used in conjunction therewith. Fig. 3 is a vertical sectional view of the vehicle-hub and spindle, showing the device in position, and Fig. 4 is a horizontal sectional view through the line $x\ x$ in Fig. 3.

Similar letters of reference indicate corresponding parts in all the figures.

My invention has relation to devices for preventing sand and mud from entering the vehicle-hub, thereby cutting the spindle and often causing the wheel to bind. This class of devices are usually termed "sand-bands;" and my invention consists in the detailed construction of a metallic sand-band, and a clip-plate or guard-plate adapted to be used in conjunction therewith, substantially as hereinafter more fully described and claimed.

My improved sand-band A is cast of suitable metal, and provided with an inside rim, B, and a beveled edge, C, on the side where it faces and is attached to the hub shown at D. It is fastened to the hub by means of screws or nails inserted through holes E in the rim B.

F is the mud-plate or guard-plate, which has a square recess or opening, G, so as to fit over the projecting end of the axle, with its wings or side plates, H H, clamping opposite sides of the same by tightening the bolt J, which is inserted through bolt-holes in the enlarged lower ends of the wings H, and is provided with a tightening-nut, K. The circular plate F is of such a size that it will fit inside of the circular sand-band A, bearing against its flange or rim B, and, by fastening this plate upon the projecting outer end of the axle-spindle by means of its wings H H and bolt J, free access may be had at any time to the outer end of the thimble-skein and nut, without the necessity of removing the mud-plate. In order to remove the latter it is only necessary to loosen the tightening-nut K, when wings H H will spread sufficiently to permit the plate to be slipped off of the axle.

By beveling the side of the sand-band next to the wheel, as shown at C, the lubricating-oil or axle-grease is prevented from running out over and soiling the vehicle; and it will be seen that the parallel side wings, H H, not only serve as means for fastening the mud-plate or guard-plate upon the axle, but also operate as guards or deflectors, preventing dirt from entering the opening or recess G sidewise, and thereby find its way into the hub.

Having thus described my invention, I claim and desire to secure by Letters Patent of the United States—

In a hub for vehicles, the combination of the hub proper, the sand-band having inside rim or flange, B, and bevel C, the spindle and the mud-plate or guard-plate F, having square recess G, adapted to fit the outer end of the spindle, and provided with parallel projecting sides or wings H H, bolt J, and nut K, substantially as and for the purpose shown and set forth.

In testimony that I claim the foregoing as my own I have hereunto affixed my signature in presence of two witnesses.

OSCAR E. DAVIS.

Witnesses:
J. S. MUXEN,
A. D. CRUMB.